(12) United States Patent
Cordova Diaz (10) Patent No.: US 9,806,502 B2
(45) Date of Patent: Oct. 31, 2017

(54) HYBRID PLUG-ON/PIGTAIL NEUTRAL BAR

(71) Applicant: SCHNEIDER ELECTRIC USA, INC., Schaumburg, IL (US)

(72) Inventor: Rene Ktnwa Cordova Diaz, Monterrey (MX)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 15/101,505

(22) PCT Filed: Dec. 19, 2013

(86) PCT No.: PCT/US2013/076459
§ 371 (c)(1),
(2) Date: Jun. 3, 2016

(87) PCT Pub. No.: WO2015/094267
PCT Pub. Date: Jun. 25, 2015

(65) Prior Publication Data
US 2017/0025830 A1    Jan. 26, 2017

(51) Int. Cl.
| | |
|---|---|
| H02B 1/20 | (2006.01) |
| H01B 5/02 | (2006.01) |
| H02B 1/04 | (2006.01) |
| H02B 1/056 | (2006.01) |
| H01R 9/26 | (2006.01) |

(52) U.S. Cl.
CPC ............... *H02B 1/20* (2013.01); *H01B 5/02* (2013.01); *H02B 1/041* (2013.01); *H02B 1/056* (2013.01); *H01R 9/2691* (2013.01); *H02B 1/205* (2013.01)

(58) Field of Classification Search
CPC ........... H02B 1/041; H02B 1/056; H01B 5/02
See application file for complete search history.

(56) References Cited

U.S. PATENT DOCUMENTS

| | | | | |
|---|---|---|---|---|
| 2,967,287 A | * | 1/1961 | Sori | H01R 4/36 |
| | | | | 439/724 |
| 3,312,874 A | | 4/1967 | Stanback | |
| 4,153,318 A | | 5/1979 | Bishop et al. | |
| 4,167,769 A | * | 9/1979 | Luke | H02B 1/056 |
| | | | | 361/637 |
| 4,449,296 A | * | 5/1984 | Luke | H02B 1/056 |
| | | | | 29/883 |

(Continued)

FOREIGN PATENT DOCUMENTS

WO    2015119609 A1    8/2015

OTHER PUBLICATIONS

International Search Report and Written Opinion dated Apr. 18, 2014 in PCT/US13/76459, 18 pages.

(Continued)

*Primary Examiner* — Robert J Hoffberg
(74) *Attorney, Agent, or Firm* — Locke Lord LLP (57) ABSTRACT

A neutral bus bar for an electrical distribution apparatus. The neutral bus bar includes an elongated body that has a rail and a plurality of wire connectors arranged. Each of the wire connectors includes a side hole on the body and a top hole. The side hole can receive an electrical neutral wire such as from a pig tail type circuit breaker. The top hole has a mouth which opens onto the recessed channel and can receive a tightening screw to secure the received electrical wire in the side hole.

12 Claims, 6 Drawing Sheets

(56) References Cited

U.S. PATENT DOCUMENTS

| | | | | |
|---|---|---|---|---|
| 6,036,542 A * | 3/2000 | Montague | ............... | H02B 1/04 |
| | | | | 439/575 |
| 7,508,653 B2 * | 3/2009 | Parlee | .................... | H02B 1/205 |
| | | | | 361/636 |
| 7,957,122 B2 | 6/2011 | Sharp | | |
| 8,693,169 B2 * | 4/2014 | Diaz | ..................... | H02B 1/056 |
| | | | | 361/627 |
| 8,929,055 B2 * | 1/2015 | Potratz | .................. | H02B 1/056 |
| | | | | 174/149 B |
| 8,953,306 B2 * | 2/2015 | Wheeler | .................. | H02B 1/20 |
| | | | | 174/149 B |
| 9,203,231 B2 * | 12/2015 | Samuelson | ............. | H02H 3/16 |
| 9,496,111 B1 * | 11/2016 | Titus | ...................... | H01H 71/08 |
| 9,548,548 B2 * | 1/2017 | Potratz | ................ | H01R 9/2458 |
| 9,666,398 B2 * | 5/2017 | Robinson | ........... | H01H 71/0207 |
| 2013/0164961 A1 | 6/2013 | Diaz et al. | | |
| 2014/0165390 A1 | 6/2014 | Potratz et al. | | |
| 2015/0380842 A1 * | 12/2015 | Pearson | ................ | H02B 1/056 |
| | | | | 361/624 |
| 2016/0141134 A1 * | 5/2016 | Pearson | .................. | H01H 9/20 |
| | | | | 200/50.21 |
| 2017/0033523 A1 * | 2/2017 | Mittelstadt | ............... | H01R 4/36 |

OTHER PUBLICATIONS

Eaton Cutler-Hammer, "Plug into Savings" Flyer, Eaton Corporation, Nov. 2006, 4pp.

\* cited by examiner

HYBRID PLUG-ON/PIGTAIL NEUTRAL BAR

FIELD

The present disclosure relates to the field of neutral bus bars for an electrical panel, and more particularly, to a hybrid neutral bus bar which is able to accommodate a neutral plug-on connection or a neutral wire connection used by different types of circuit breakers.

BACKGROUND

Arc-fault interruption (AFI) and ground-fault interruption (GFI) circuit breakers are well known. Such circuit breakers have traditionally required an extra conductor, called a "pigtail," to connect the breaker to a line-side neutral conductor of an electrical distribution panel or load center (these terms are used interchangeably herein). Increased use of arc-fault circuit breakers in a residential load center results in additional pigtails crowding the wiring gutter of the load center, making it more difficult to wire as more circuit breakers are added and creating a jumble of wires. Furthermore, to wire the pigtail, the installer must connect the wire at the side line neutral conductor using a tool, thereby making the wiring more time consuming.

More recently, AFI and GFI circuit breakers feature a "plug-on neutral" (PON or PoN), which replaces the pigtail, and allows the circuit breaker to be "plugged onto" the neutral bus bar directly. Instead of a pigtail, the circuit breaker has a connector called a neutral clip that directly plugs onto the neutral conductor in the electrical distribution panel. The neutral clip typically faces downward away from a bottom surface of the circuit breaker so that it is oriented to be plugged directly onto a neutral conductor in the electrical panel or load center. However, certain disadvantages remain when accommodating plug-on-neutral circuit breakers as well as pigtail-neutral circuit breakers in the same panel because both circuit breaker types are widely used. For example, one known type of hybrid neutral bus bar utilizes a square screw down rail, which has a flat and even top surface through which to insert a tightening screw (also known as a "hold down screw") for use with a wire type circuit breaker or on which to secure a neutral clip of a PON circuit breaker. The flat top surface of the rail makes it difficult to properly secure a neutral clip of a PON circuit breaker onto the rail. Furthermore, the tightening screws, which extend above the top surface of the rail when engaged therein, also may interfere with proper connection of the neutral clip onto the rail.

SUMMARY

A neutral bus bar for an electrical distribution apparatus, such as an electrical panel (e.g., a load center or panel board), is disclosed which can support both a plug-on connection and a wire connection for a circuit breaker or other electrical devices connected on the panel. The neutral bus bar includes an elongated body, which has a rail that extends along a top portion of the body. The rail includes a recessed channel. The rail is configured to receive a neutral clip from a plug-on type circuit breaker (e.g., a PON circuit breaker) to plug the circuit breaker onto the rail. The elongated body also includes a plurality of wire connectors arranged along the body. Each of the wire connectors includes a side hole on the body for receiving an electrical wire (e.g., the pigtail coiled neutral wire) from a neutral-wire type circuit breaker, and a top hole with a threaded bore on the body for receiving a tightening screw to secure a received electrical wire in the side hole. The top hole includes a mouth which opens onto the recessed channel, and is accessible through the recessed channel. The rail on the top portion of the neutral bus bar preferably has shaped areas, such as rounded or curved, on each side of the rail, to provide a shape or dimension which improves plug-on connection of the neutral clip of the breaker onto the neutral bus bar and preferably extends above the heads of tightening screws inserted fully in the threaded bores.

The neutral bus bar does not require the use of additional components to support both a plug-on connection and a wire connection, and can be retrofitted onto existing electrical panels and used with existing breakers. Furthermore, the neutral bus bar of the present disclosure will provide the benefits of a plug-on connection, such as reduced connection time, connection without the use of tools and minimized use of wires to make the connection.

BRIEF DESCRIPTION OF THE DRAWINGS

The description of the various exemplary embodiments is explained in conjunction with the appended drawings, in which.

DETAILED DESCRIPTION

Figure 1:
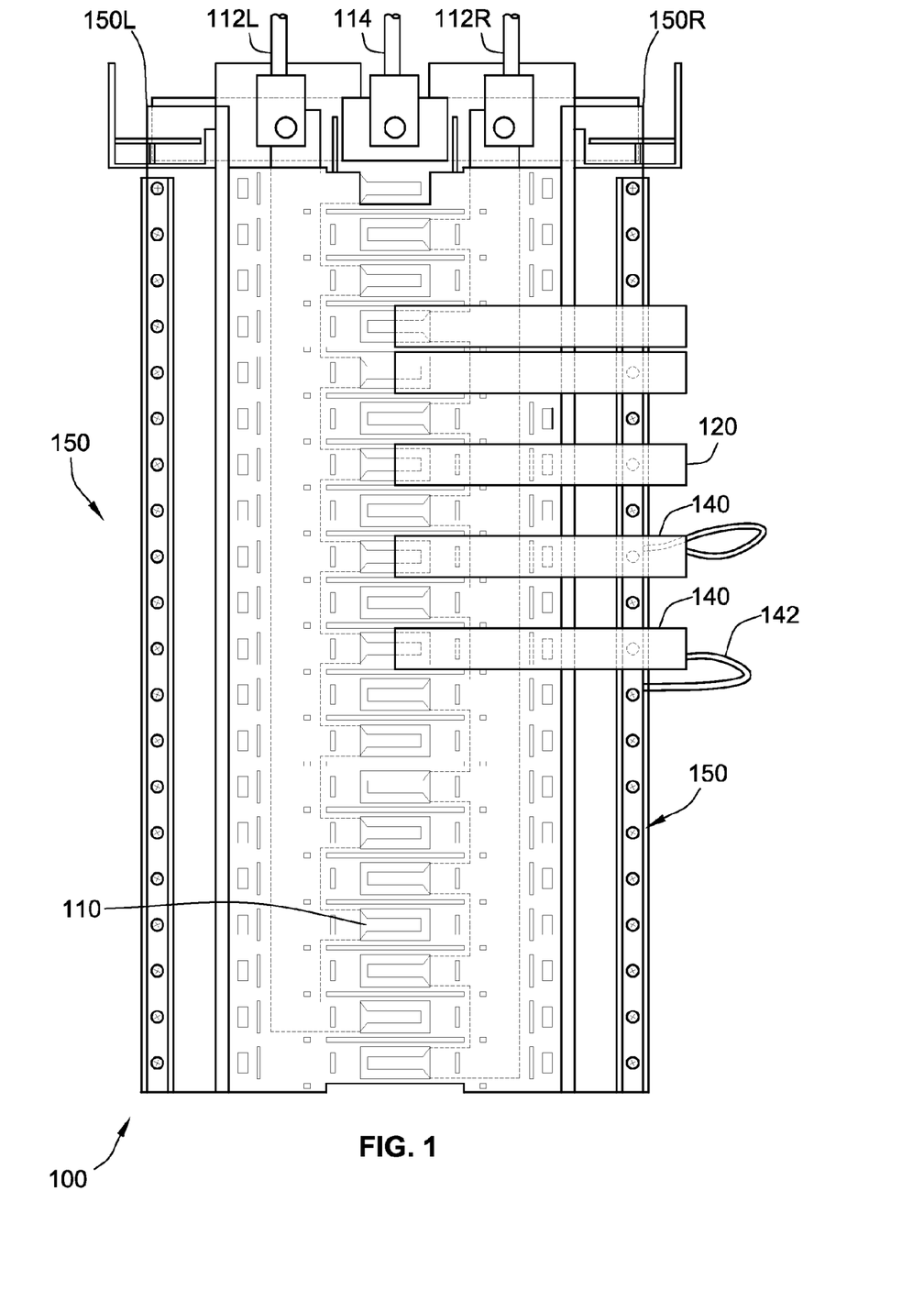
FIG. 1 illustrates a front view of an electrical panel having line and neutral bus bars (or conductors) installed on the left side and the right side of the panel and circuit breakers connected to the bus bars.

Referring to FIG. 1, a front view is shown of an interior of an electrical panel 100 (also referred to as an "electrical distribution panel"), such as a panel board or residential load center. The electrical panel 100 has installed thereon neutral bus bars 150L and 150R (collectively 150, where L refers to a left side of the electrical panel 100 and R refers to a right side of the electrical panel 100). The electrical panel 100 is arranged to receive side-by-side circuit breakers in two parallel rows on left and right sides of the electrical panel 100. In a center section of the electrical panel 100, panel connectors 110 engage corresponding conventional plug-on line clip or jaw connectors (not shown) of each of the circuit breakers and connect the circuit breakers to a line current that is carried through first lines 112L and second lines 112R (collectively, 112). In the illustrated embodiment, the panel connectors 110 electrically engage either the first line 112L, or the second line 112R. Fewer or more lines can be used. One neutral bus bar 150R is provided along a right-hand side (from the perspective of an observer looking at the front of the electrical panel 100) of the interior of the electrical panel 100. A second neutral bus bar 150L is provided along a left-hand side of the interior of the electrical panel 100. The neutral bus bars 150 are made of an electrically conductive material, such as copper or aluminum, and are electrically engaged with a line-side neutral 114. "Line-side" refers to circuits and connections upstream of the circuit breakers toward the source of line current, as opposed to load-side, which refers to circuits and connections downstream of the circuit breakers toward the load(s) being protected by the circuit breakers.

Circuit breakers of various types can be installed into the electrical panel 100. For example, the circuit breakers can include any combination of a plug-on type circuit breaker 120 (e.g., a PON circuit breaker) or a wire type circuit breaker 140 (e.g., a pigtail-neutral circuit breaker). Some wire type circuit breakers can have an electrical neutral wire 142 (called a pigtail due to its curly configuration) that is manually fastened to the neutral bus bar 150 within the electrical panel 100 to connect the circuit breaker to the line-side neutral 114. Such circuit breakers bearing an electrical wire for their neutral connection may or may not have a connector in the form of a protruding mounting jaw for connecting onto a mounting dummy rail (not shown) as it is done currently or onto the neutral bus bar 150 to secure the breaker in the final position. In pigtail-neutral circuit breakers having a position-maintaining mounting jaw, the mounting jaw can be made of a non-electrically conductive material such as plastic. Alternately, the PON circuit breakers have an electrically conductive neutral clip that electrically connects the circuit breaker to the neutral bus bar 150 and thereby to the line-side neutral 114. Accordingly, as will be described in further detail below, the neutral bus bar 150 can reliably accommodate both wire connections and plug-on connections of various types of circuit breakers.

Figure 2:
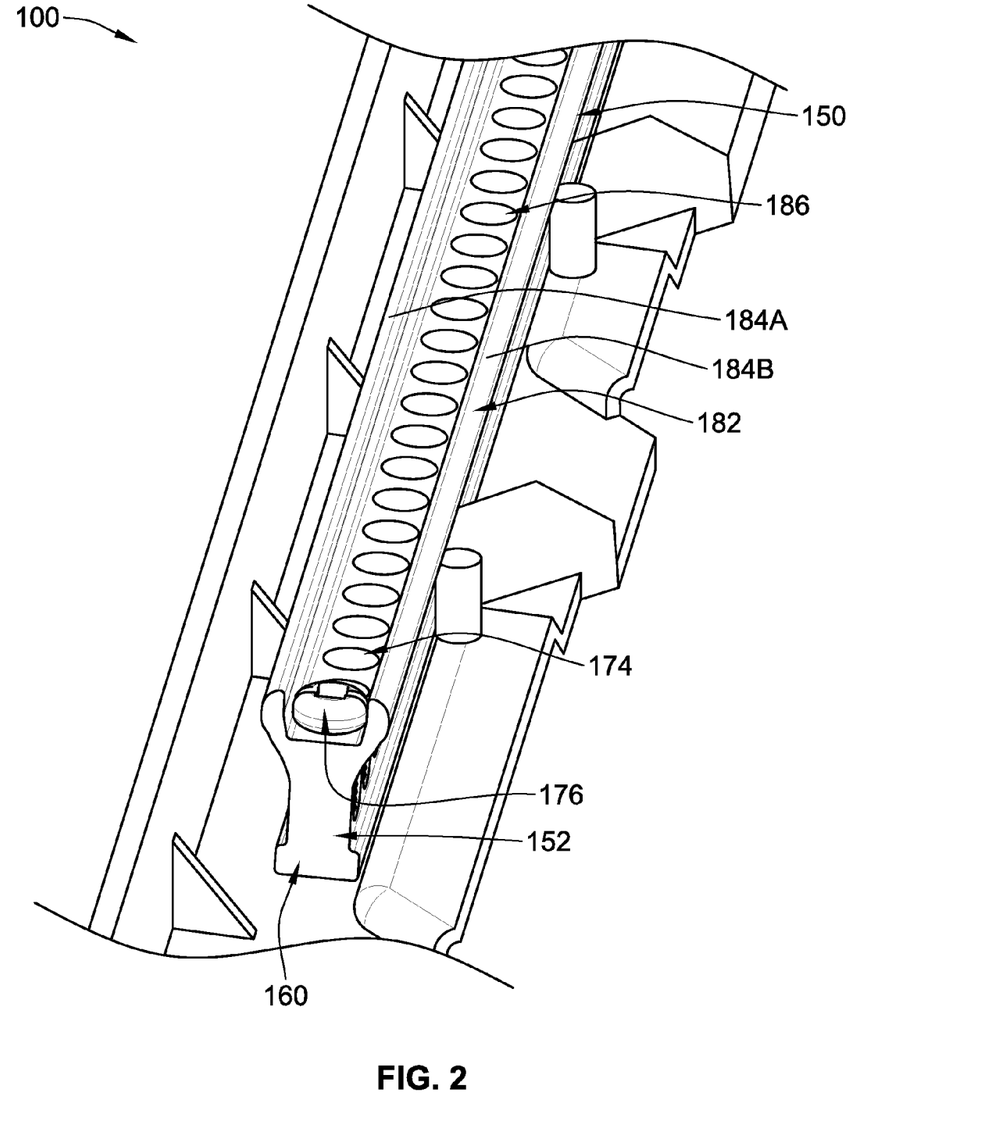
FIG. 2 illustrates a partial enlarged view of an exemplary neutral bus bar of FIG. 1 installed on the electrical panel in accordance with a first embodiment of the present disclosure.
Figures 3, 4:
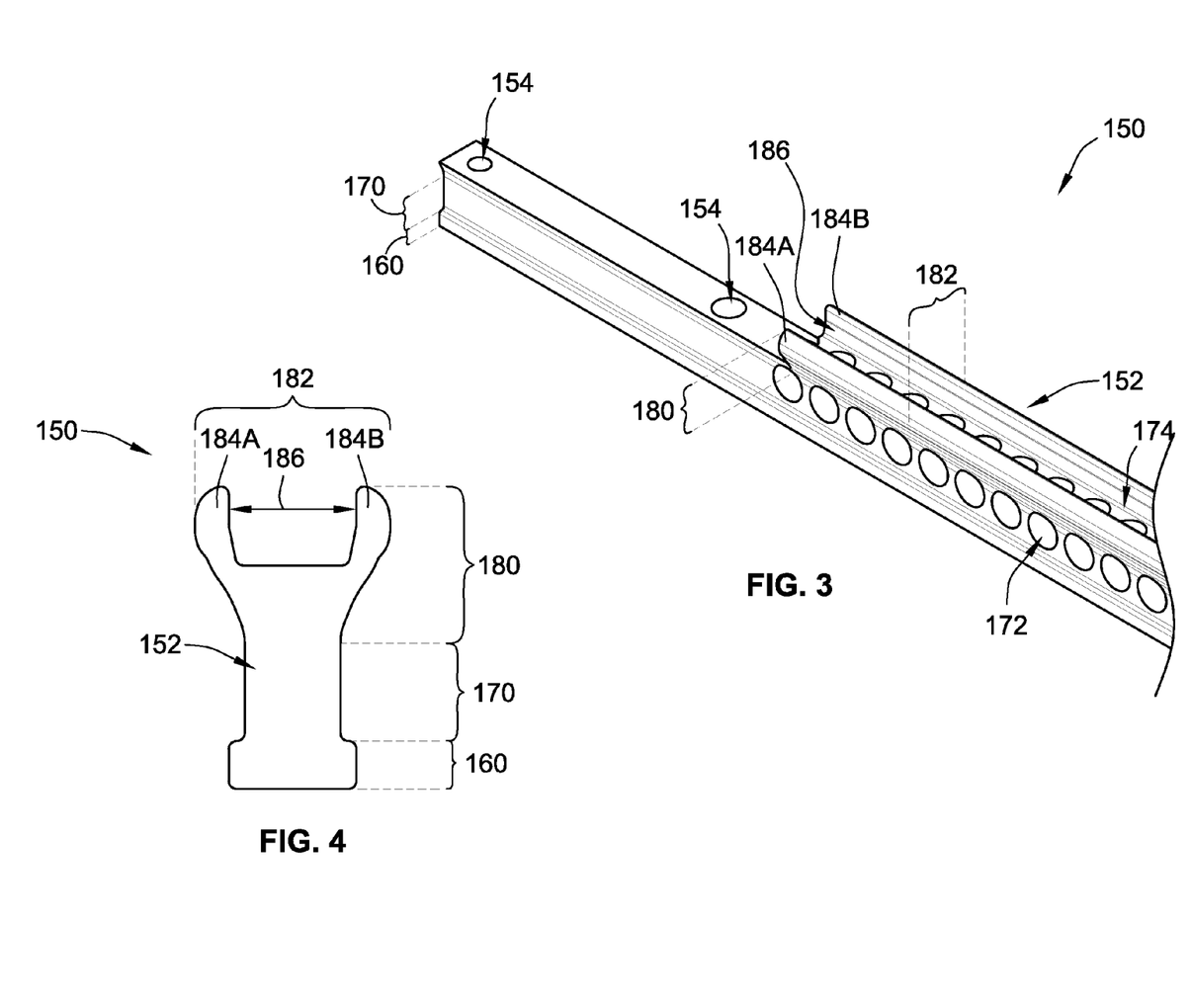
FIG. 3 illustrates a perspective view of the neutral bus bar of FIG. 2 with a rail having two ridges extending along a length of a portion of the rail and a recessed channel arranged between the two ridges.
FIG. 4 illustrates a view of a cross-section of the neutral bus bar of FIG. 2 perpendicular to a length or elongation of the body of the neutral bus bar.

FIG. 2 shows an enlarged view of a portion of the electrical panel 100 with one of the neutral bus bars 150, in accordance with a first embodiment of the present disclosure. FIG. 3 shows a perspective view of one of the neutral bus bars 150 of FIG. 2. FIG. 4 shows a view of a cross-section of one of the neutral bus bars 150 of FIG. 2. As used herein, "cross-section" or "cross-sectional", when used to describe a part of the body 152 of the neutral bus bar 150, refers to a cross-section of that part which is perpendicular to a length or elongation of a portion of the body 152.

As shown in FIGS. 3 and 4, the neutral bus bar 150 can include an elongated body 152, which has a bottom portion (or base) 160, a middle portion 170 and a top portion 180. The top portion 180 includes a rail 182 with a recessed channel 186. The rail 182 extends along at least portion of a length or along a longitudinal axis of the neutral bus bar 150. The sides or areas of the top portion 180, which are part of the rail 182, are curved or rounded. For example, the rail 182 includes ridges 184A and 184B positioned on opposite sides of the recessed channel 186. The ridges 184A and 184B extend upwards and outwards from the body 152 and, in this example, have a curved or rounded cross-sectional shape. The rail 182 extends along a length or longitudinal axis of the neutral bus bar 150, and is configured to receive a neutral clip from a plug-on type circuit breaker, such as a PON circuit breaker. In this example, the rail 182 has a Y-shape in a cross-section perpendicular to a direction of body elongation or length of the body 152 of the neutral bus bar 150. Furthermore, the top portion 180 has a cross-sectional width that is greater than a cross-sectional width of the middle portion 170. The body 152 of the neutral bus bar 150 may also include holes 154, which can be used to secure the neutral bus bar 150 onto the electrical panel 100, using screws or bolts.

Furthermore, the body 152 of the neutral bus bar 150 includes one or more wire connectors (or wire connection assemblies) spaced apart along the length of a portion of the neutral bus bar 150. Each wire connector includes a side hole 172 on the middle portion 170 of the body 142 and a corresponding top hole 174 on the body 152. The side hole 172 is configured to receive a neutral wire, such as a pigtail neutral wire, of a wire type circuit breaker. Turning back to FIG. 2, the top hole 174 is threaded (e.g., a threaded bore) and receives a tightening screw 176, which is used to secure a neutral wire (not shown) received in the side hole 172 in the neutral bus bar 150. The top hole 174 includes a mouth thereof which opens onto the recessed channel 186, and is accessible through the recessed channel 186. The rail 182 extends above the head(s) of the tightening screw(s) 176, which are secured in the body 152 through the top hole(s) 174 accessible via the recessed channel 186.

Figure 5:
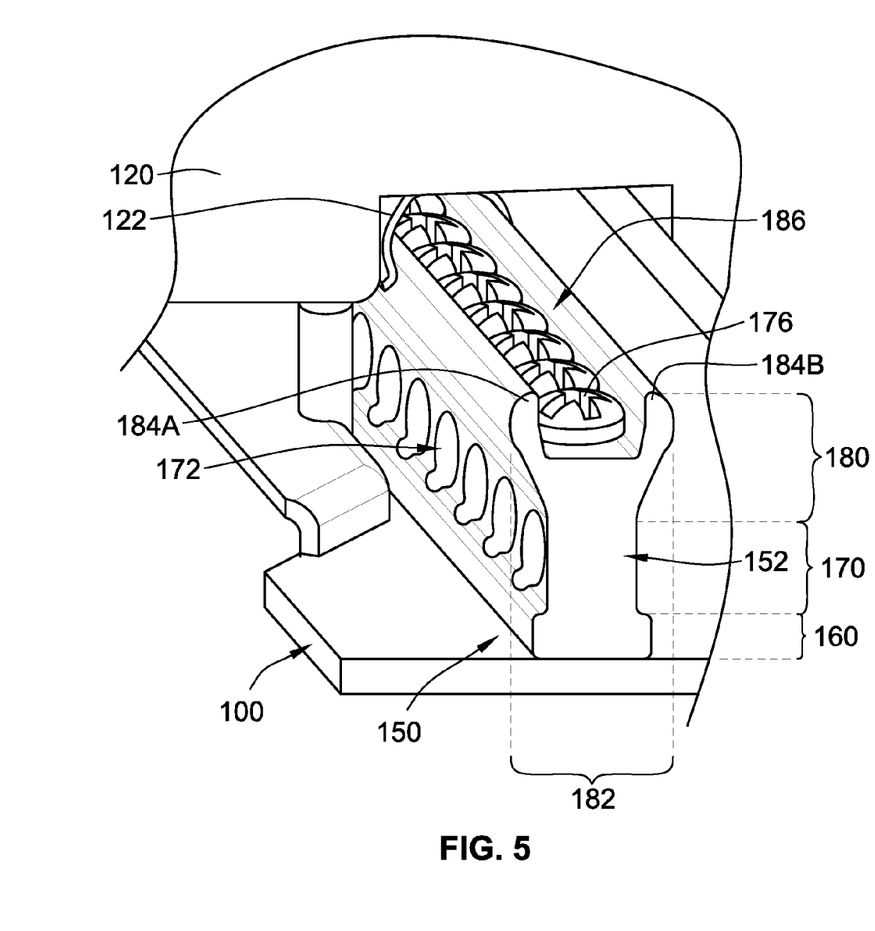
FIG. 5 illustrates a partial view of a plug-on type circuit breaker, such as a PON circuit breaker, having a neutral clip connected onto and over the rail of the neutral bus bar of FIG. 2.
Figure 6:
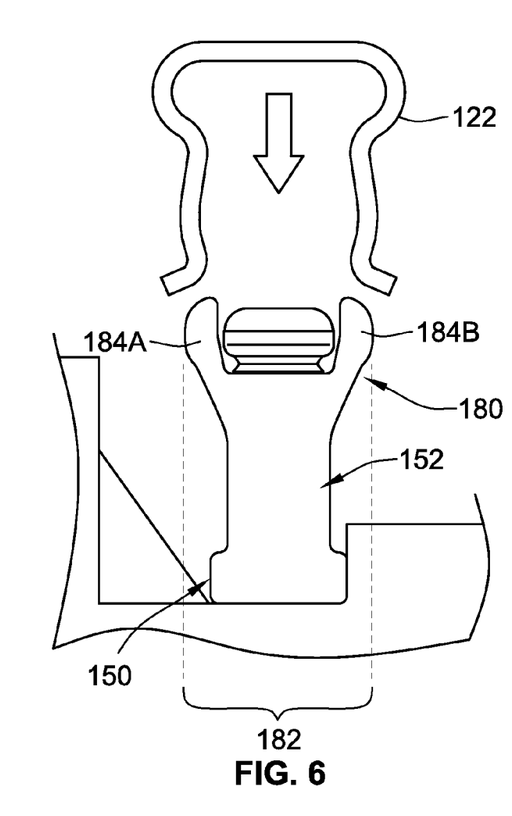
FIG. 6 illustrates a view of a neutral clip of a plug-on type circuit breaker to be connected onto and over the rail of the neutral bus bar of FIG. 2.

Operational examples for connecting a plug-on type or a wire type circuit breaker onto the neutral bus bar 150 are discussed below with references to FIGS. 5 and 6 for a plug-on type circuit breaker and FIG. 7 for a wire type circuit breaker. As shown in FIG. 5, a plug-on type circuit breaker 120 includes a neutral clip 122, which is made of a resilient and conductive material. The clip 122, as shown in FIG. 6, of the plug-on type circuit breaker 120 can be positioned over the rail 182 and pressed down onto the rail 182 so that the neutral clip 122 is plugged onto and over the rail 182 as shown in FIG. 5. As further shown in FIG. 5, the rail 182 extends above the heads of the tightening screws 176 engaged in respective top holes 174 in the recessed channel 186. Accordingly, the tightening screws 176 can be left on the rail 182, without having them interfere when plugging the neutral clip 122 of the plug-on type circuit breaker 120 onto and over the rail 182. The rounded or curved areas of the rail 182 also provide for a better physical and electrical connection with the neutral clip 122 of the plug-on type circuit breaker 120.

Figure 7:
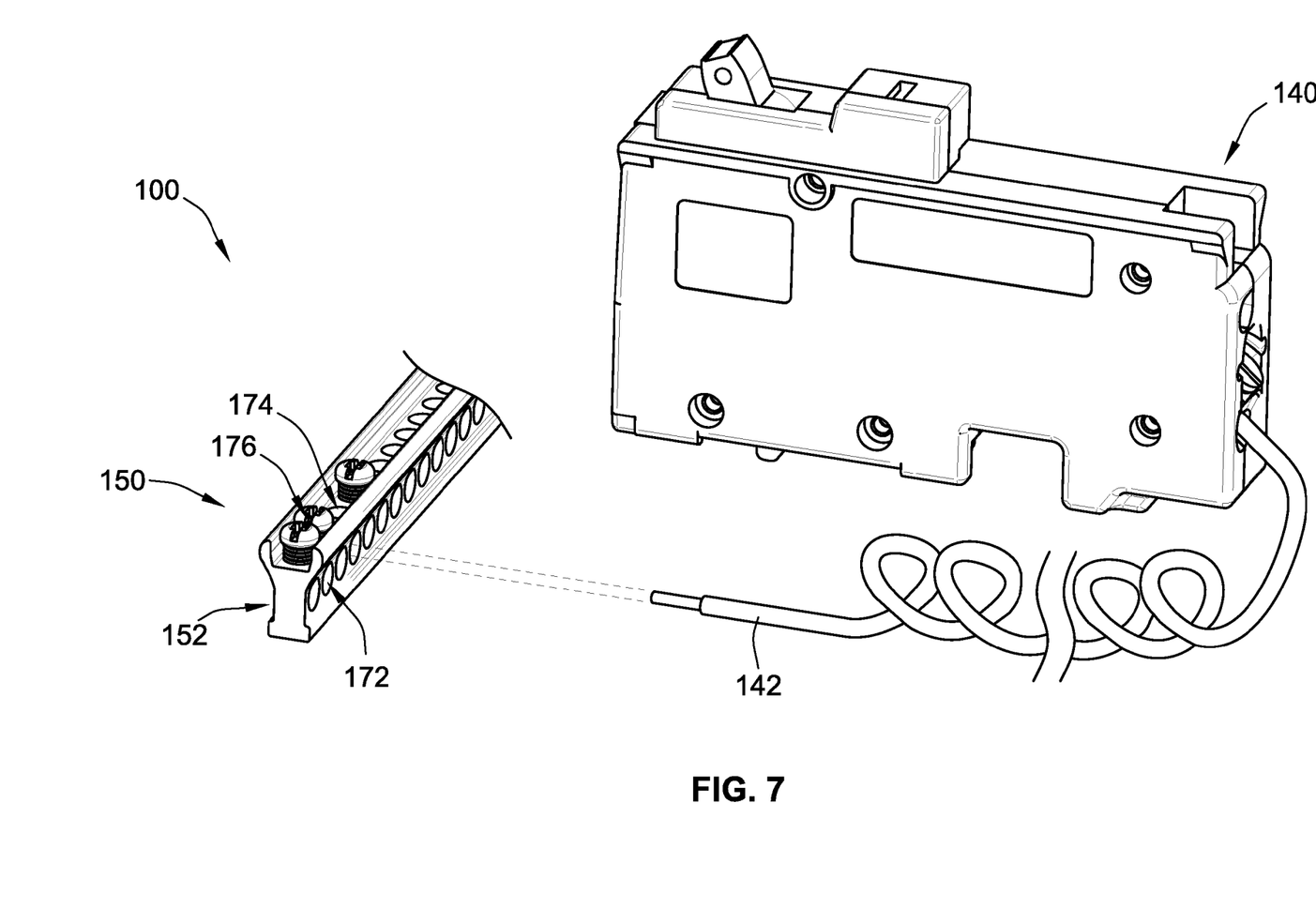
FIG. 7 illustrates a perspective view of a wire type circuit breaker having a neutral wire, in this case a pigtail neutral wire, to be connected to the neutral bus bar of FIG. 2 via a wire connector on the neutral bus bar.
Figure 8:
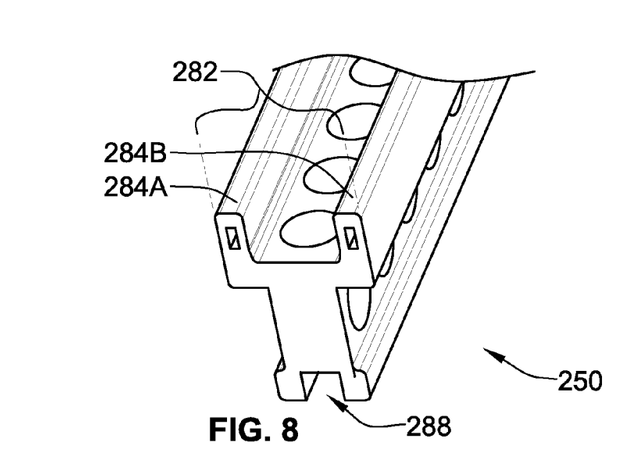
FIG. 8 illustrates an example of a neutral bus bar with a rail having rectangular-cross-sectional ridges extending along opposite sides of a recessed channel on a top portion of the bus bar and the bottom portion also including a recessed channel in accordance with a second embodiment of the present disclosure.

FIG. 7 illustrates a perspective view of a wire type circuit breaker 140 having a neutral wire 142, in this case a pigtail neutral wire. As part of the installation of the wire type circuit breaker 140 onto the electrical panel 100, the neutral wire 142 is connected to the neutral bus bar 150, via a wire connector. For example, as shown, the neutral wire 142 of the wire type circuit breaker 140 can be inserted through the side hole 172 on the body 152. Thereafter, a tightening screw 176 can be screwed into a corresponding top hole 174 to hold down and connect the neutral wire 142 to the neutral bus bar 150. The wire type circuit breaker 140 can also include a protruding mounting jaw (not shown), which can be plugged onto a mounting dummy rail or the rail 182 of the neutral bus bar 150 to physically secure the breaker onto the electrical panel 100. The protruding mounting jaw can be a non-conductive or plastic clip.

Figure 9:
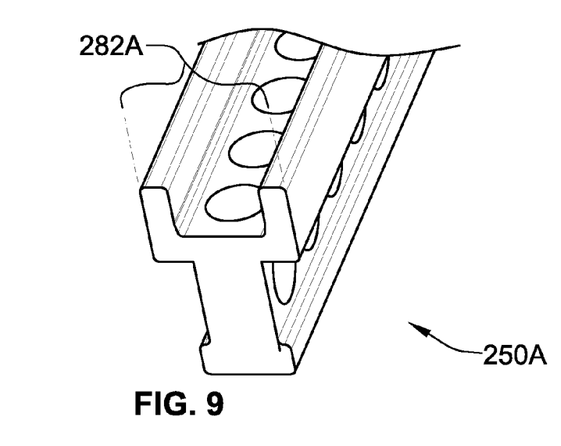
FIG. 9 illustrates an example of a neutral bus bar, such as the neutral bus bar of FIG. 8, in accordance with a third embodiment of the present disclosure.
Figure 10:
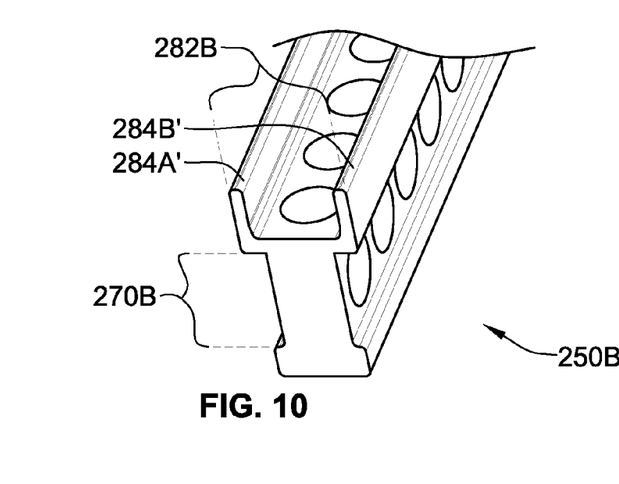
FIG. 10 illustrates an example of a neutral bus bar, such as the neutral bus bar of FIG. 9, except that each ridge has a rectangular cross-sectional shape that is thinner and a middle portion of the bus bar is longer in accordance with a fourth embodiment of the present disclosure.
Figure 11:
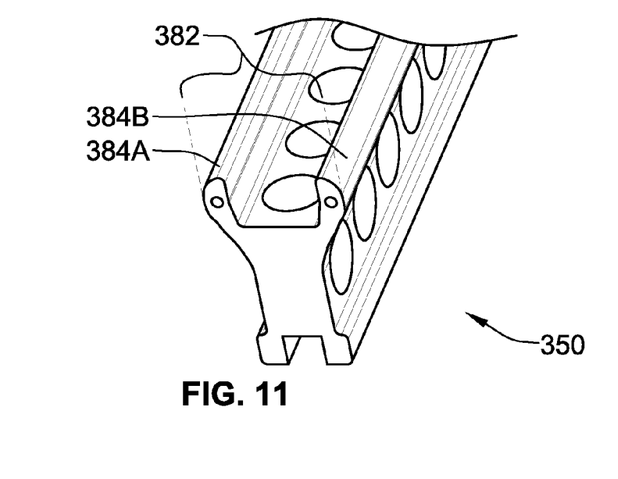
FIG. 11 illustrates an example of a neutral bus bar with a rail having ridges that have a cross-section with a circular arc shape and extend along opposite sides of a recessed channel on a top portion of the bus bar in accordance with a fifth embodiment of the present disclosure.

FIGS. 8, 9, 10 and 11 illustrate additional examples of respective neutral bus bars 250, 250A, 250B and 350 in accordance with second, third, fourth and fifth embodiments of the present disclosure, respectively. Each of the neutral bus bars 250, 250A, 250B and 350 also includes a top, middle and bottom portion and a rail with a recessed channel as in the neutral bus bar 150 of FIGS. 2 through 5, except each of them may have a different shaped rail or ridges, may have a recessed channel in the bottom portion and/or may have a longer middle portion. For example, in FIG. 8, the neutral bus bar 250 includes extending ridges 284A and 284B (e.g., extending side portions of the rail 282) which have a rectangular cross-section, and a recessed channel 288 at a bottom portion. The neutral bus bar 250A of FIG. 9 is essentially the same as the neutral bus bar 250 of FIG. 8, except that the neutral bus bar 250A does not include a recessed channel at a bottom portion. The neutral bus bar 250B of FIG. 10 is essentially the same as the neutral bus bar 250A of FIG. 9, except that the neutral bus bar 250B has a longer middle portion 270B. The neutral bus bar 250B also includes a rail 282B with opposing ridges 284A' and 284B' that have a thinner or smaller cross-sectional width than those of rail 282A of the neutral bus bar 250A of FIG. 9. In FIG. 11, the neutral bus bar 350 includes a rail 382 with opposing ridges 384A and 384B. Each of the ridges 384A and 384B has a rounded or curved cross-sectional shape, in this example, a circular shape (e.g., a circular arc shape).

The disclosed embodiments of the neutral bus bar are simply provided as examples. The size and shape of the ridges, side portions and the recessed channel of the rail on the neutral bus bars can be modified while retaining their functionality in accordance with the present disclosure. The neutral bus bars may be molded, stamped and/or punched, and may be formed of a conductive material, such as copper, aluminum or any suitable conductive material or composition of materials depending on the application and the desired electrical specifications. Furthermore, the neutral bus bars may be formed as a unitary piece or as multiple pieces to be assembled together.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

The invention claimed is:

1. A neutral bus bar for use within an electrical distribution apparatus, comprising:
 an elongated body including:
  a top portion of the elongated body having a rail with a recessed channel, the rail configured to receive a clip from a first type of circuit breaker to plug the first type of circuit breaker onto the rail, the rail with the recessed channel has a Y-shape in a cross-section perpendicular to a direction of body elongation; and
 a plurality of wire connectors arranged along the elongated body, each of the wire connectors including a side hole on the elongated body for receiving an electrical wire from a second type of circuit breaker and a top hole on the top portion of the elongated body for receiving a tightening screw to secure the received electrical wire in the side hole, the top hole including a mouth thereof which opens onto the recessed channel.

2. The neutral bus bar of claim 1, wherein the rail comprises two ridges extending upwards from opposing sides along a length of the top portion with the recessed channel arranged therebetween.

3. The neutral bus bar of claim 1, wherein the elongated body includes the top portion having the rail, a middle portion having the side holes and a bottom portion which provides a support base, the rail being wider than the middle portion.

4. The neutral bus bar of claim 1, wherein each side of the rail is curved.

5. The neutral bus bar of claim 1, wherein the rail extends above the tightening screws when engaged in the top hole.

6. An electrical distribution apparatus comprising:
 a plurality of bus bars including a neutral bus bar, the neutral bus bar comprising:
  an elongated body including:
   a top portion of the elongated body having a rail with a recessed channel, the rail configured to receive a clip from a first type of circuit breaker to plug the first type of circuit breaker onto the rail, the rail with the recessed channel has a Y-shape in a cross-section perpendicular to a direction of body elongation; and
  a plurality of wire connectors arranged along the elongated body, each of the wire connectors including a side hole on the elongated body for receiving an electrical wire from a second type of circuit breaker and a top hole on the top portion of the elongated body for receiving a tightening screw to secure the received electrical wire in the side hole, the top hole including a mouth thereof which opens onto the recessed channel.

7. The electrical distribution apparatus of claim 6, wherein the rail comprises two ridges extending upwards from opposing sides along a length of the top portion with the recessed channel arranged therebetween.

8. The electrical distribution apparatus of claim 6, wherein the elongated body includes the top portion having the rail, a middle portion having the side holes and a bottom portion which provides a support base, the rail being wider than the middle portion.

9. The electrical distribution apparatus of claim 6, wherein each side of the rail is curved.

10. The electrical distribution apparatus of claim 6, wherein the rail extends above the tightening screws when engaged in the top hole.

11. The electrical distribution apparatus of claim 6, wherein the neutral bus bar comprises two of the neutral bus bars, each of the two neutral bus bars being arranged on an opposite side of the electrical distribution apparatus.

12. The electrical distribution apparatus of claim 6, further comprising one of the first type of circuit breaker plugged onto the rail or the second type of circuit breaker having the electrical wire connected to one of the wire connectors.

* * * * *